United States Patent
Kim et al.

(10) Patent No.: US 10,346,693 B1
(45) Date of Patent: Jul. 9, 2019

(54) METHOD AND DEVICE FOR ATTENTION-BASED LANE DETECTION WITHOUT POST-PROCESSING BY USING LANE MASK AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/254,572

(22) Filed: Jan. 22, 2019

(51) Int. Cl.
*G06K 9/00* (2006.01)
*G06K 9/62* (2006.01)
*G06N 3/08* (2006.01)

(52) U.S. Cl.
CPC ......... *G06K 9/00798* (2013.01); *G06K 9/623* (2013.01); *G06K 9/6232* (2013.01);
(Continued)

(58) Field of Classification Search
CPC ............ G06K 9/00798; G06K 9/6267; G06K 9/6261; G06K 9/6257; G06K 9/6232; G06K 9/623; G06K 9/6262; G06N 3/08
See application file for complete search history.

(56) References Cited

U.S. PATENT DOCUMENTS

| | | | |
|---|---|---|---|
| 10,198,671 B1 * | 2/2019 | Yang | G06K 9/6269 |
| 10,229,346 B1 * | 3/2019 | Kim | G06K 9/6262 |

(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*

(Continued)

*Primary Examiner* — John B Strege
(74) *Attorney, Agent, or Firm* — Xsensus LLP

(57) ABSTRACT

A method of attention-based lane detection without post-processing by using a lane mask is provided. The method includes steps of: a learning device instructing a CNN to acquire a final feature map which has been generated by applying convolution operations to an image, a segmentation score map, and an embedded feature map which have been generated by using the final feature map; instructing a lane masking layer to recognize lane candidates, generate the lane mask, and generate a masked feature map; instructing a convolutional layer to generate a lane feature map; instructing a first FC layer to generate a softmax score map and a second FC layer to generate lane parameters; and backpropagating loss values outputted from a multinomial logistic loss layer and a line fitting loss layer, to thereby learn parameters of the FC layers, and the convolutional layer. Thus, lanes at distance can be detected more accurately.

24 Claims, 6 Drawing Sheets

(52) U.S. Cl.
CPC ......... *G06K 9/6257* (2013.01); *G06K 9/6261*
(2013.01); *G06K 9/6262* (2013.01); *G06K*
*9/6267* (2013.01); *G06N 3/08* (2013.01)

(56) References Cited

U.S. PATENT DOCUMENTS

| | | | |
|---|---|---|---|
| 2016/0148079 A1* | 5/2016 | Shen .................... | G06K 9/4628 382/157 |
| 2016/0239706 A1* | 8/2016 | Dijkman ............ | G06K 9/00503 |
| 2016/0358069 A1* | 12/2016 | Brothers ................ | G06F 7/764 |
| 2016/0358337 A1* | 12/2016 | Dai ........................ | G06T 5/10 |
| 2017/0011281 A1* | 1/2017 | Dijkman ................ | G06K 9/66 |
| 2017/0039436 A1* | 2/2017 | Chen ................. | G06K 9/00798 |
| 2017/0124409 A1* | 5/2017 | Choi .................. | G06N 3/0454 |
| 2017/0124415 A1* | 5/2017 | Choi ....................... | G06N 3/08 |
| 2017/0169315 A1* | 6/2017 | Vaca Castano ...... | G06K 9/3233 |
| 2017/0206431 A1* | 7/2017 | Sun ...................... | G06N 3/084 |
| 2018/0012374 A1* | 1/2018 | Fujita .................... | G03B 7/091 |
| 2018/0096457 A1* | 4/2018 | Savvides ............. | G06K 9/6267 |
| 2018/0137642 A1* | 5/2018 | Malisiewicz ............. | G06T 7/11 |
| 2018/0211403 A1* | 7/2018 | Hotson ................ | G06K 9/4604 |
| 2018/0268234 A1* | 9/2018 | Yang ...................... | G06N 3/063 |
| 2018/0285659 A1* | 10/2018 | Kwant ............... | G06K 9/00798 |
| 2018/0341872 A1* | 11/2018 | Wang .................. | G06N 3/0454 |
| 2018/0373975 A1* | 12/2018 | Yu ........................ | G06N 3/04 |
| 2019/0012548 A1* | 1/2019 | Levi .................. | G06K 9/00791 |
| 2019/0050681 A1* | 2/2019 | Tate ..................... | G06K 9/6232 |
| 2019/0057507 A1* | 2/2019 | El-Khamy ................ | G06T 7/11 |
| 2019/0065867 A1* | 2/2019 | Huang ............... | G06K 9/00798 |
| 2019/0073553 A1* | 3/2019 | Yao .......................... | G06K 9/46 |
| 2019/0073563 A1* | 3/2019 | Chapados ............... | G06F 15/00 |
| 2019/0096125 A1* | 3/2019 | Schulter .................. | G06T 17/05 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

METHOD AND DEVICE FOR ATTENTION-BASED LANE DETECTION WITHOUT POST-PROCESSING BY USING LANE MASK AND TESTING METHOD AND TESTING DEVICE USING THE SAME

FIELD OF THE INVENTION

The present invention relates to a method for attention-based lane detection without prost-processing by using a lane mask; and more particularly, the method of detecting one or more lanes included in an input image by using the lane mask, including steps of: (a) on condition that (i) a first CNN has generated a final feature map by applying one or more first convolution operations to the input image and (ii) has generated a segmentation score map and an embedded feature map by using the final feature map, instructing a second CNN to acquire the final feature map, the segmentation score map, and the embedded feature map; (b) instructing a lane masking layer of the second CNN to (i) recognize one or more lane candidates, corresponding to the lanes included in the input image, on the final feature map by referring to the segmentation score map and the embedded feature map, (ii) generate the lane mask which assigns one or more weights to one or more regions, which correspond to the lane candidates, on the final feature map and (iii) generate a masked feature map by referring to the final feature map and the lane mask; (c) instructing a convolutional layer of the second CNN to generate a lane feature map by applying one or more second convolution operations to the masked feature map; (d) instructing a first FC layer of the second CNN to generate a softmax score map by referring to the lane feature map, and instructing a second FC layer of the second CNN to generate one or more lane parameters by referring to the lane feature map; and (e) (i) instructing a multinomial logistic loss layer of the second CNN to generate softmax loss values by referring to the softmax score map and its corresponding first GT, (ii) instructing a line fitting loss layer of the second CNN to generate line fitting loss values by referring to the lane parameters and their corresponding second GTs, and (iii) backpropagating the softmax loss values and the line fitting loss values, to thereby learn parameters of at least part of the first FC layer, the second FC layer and the convolutional layer included in the second CNN, and a learning device, a testing method, and a testing device using the same.

BACKGROUND OF THE INVENTION

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Meanwhile, image segmentation is a method of generating a label image using an input image, e.g., a training image or a test image. Recently, the Deep Learning has been so much widespread that the Deep Learning is also being applied to the image segmentation.

Nowadays, the Deep Learning is widely used for autonomous driving systems. For an autonomous driving system, recognizing lanes in images capable of representing the autonomous driving circumstances is very important. Thus, the autonomous driving system (i) detects all the lane candidates by using image segmentation results and (ii) classifies the lanes by using pixel embedding results, to thereby recognize the respective lanes.

However, the conventional lane recognizing technique shown above has a critical shortcoming that (i) processes for filtering non-lane road regions which were misrecognized as lanes and (ii) processes for line-fitting should be applied to outputs of the autonomous driving system as post-processing processes.

SUMMARY OF THE INVENTION

It is an object of the present invention to solve all the problems explained above.

It is another object of the present invention to provide an integrated process including (i) a main process for recognizing lanes in input images, and (ii) post processing processes for filtering non-lane road regions and fitting the lane regions.

It is still another object of the present invention to provide a method for filtering the non-lane road regions by using feature maps whose lane parts are emphasized.

In accordance with one aspect of the present invention, there is provided a method of detecting one or more lanes included in an input image by using a lane mask, including steps of: (a) on condition that (i) a first CNN has generated a final feature map by applying one or more first convolution operations to the input image and (ii) has generated a segmentation score map and an embedded feature map by using the final feature map, a learning device instructing a second CNN to acquire the final feature map, the segmentation score map, and the embedded feature map; (b) the learning device instructing a lane masking layer of the second CNN to (i) recognize one or more lane candidates, corresponding to the lanes included in the input image, on the final feature map by referring to the segmentation score map and the embedded feature map, (ii) generate the lane mask which assigns one or more weights to one or more regions, which correspond to the lane candidates, on the final feature map and (iii) generate a masked feature map by referring to the final feature map and the lane mask; (c) the learning device instructing a convolutional layer of the second CNN to generate a lane feature map by applying one or more second convolution operations to the masked feature map; (d) the learning device instructing a first FC layer of the second CNN to generate a softmax score map by referring to the lane feature map, and instructing a second FC layer of the second CNN to generate one or more lane parameters by referring to the lane feature map; (e) the learning device (i) instructing a multinomial logistic loss layer of the second CNN to generate softmax loss values by referring to the softmax score map and its corresponding first GT, (ii) instructing a line fitting loss layer of the second CNN to generate line fitting loss values by referring to the lane parameters and their corresponding second GTs, and (iii) backpropagating the softmax loss values and the line fitting loss values, to thereby learn parameters of at least part of the first FC layer, the second FC layer and the convolutional layer included in the second CNN.

As one example, at the step of (c), the learning device instructs the convolutional layer of the second CNN to generate the lane feature map by applying the second convolution operations to the masked feature map, and then by further applying at least one global pooling operation to the masked feature map.

As one example, at the step of (b), the masked feature map is generated by element-wise multiplying each of values included in the final feature map corresponding to each of the pixels included in the input image and its corresponding value included in the lane mask, so that values of the masked feature map corresponding to the lane candidates are assigned with one or more certain weights.

As one example, at the step of (a), the first CNN has generated the embedded feature map by transforming values of the final feature map in a way of (i) increasing each of inter-class differences among each of means of the values, included in the final feature map, corresponding to pixels of the respective lanes included in the input image or (ii) decreasing each of intra-class variances of the values, included in the final feature map, corresponding to pixels included in the respective lanes included in the input image.

As one example, at the step of (b), the learning device instructs the lane masking layer of the second CNN to recognize the lane candidates by (i) detecting the lane candidates by referring to the segmentation score map and (ii) classifying the lane candidates by referring to the embedded feature map.

As one example, at the step of (b), the learning device instructs the masking layer of the second CNN to generate the lane mask which assigns the weights to the regions, wherein the regions include pixels whose distances from boundaries of the lane candidates are smaller than a third threshold value.

As one example, at the step of (e), the softmax loss values are generated by operations following a formula below, $$\text{sum of } softmax \text{ loss} = -\frac{1}{s}\sum_{i}^{s} \log(P(i)^{l_i})$$

wherein, s is the number of the pixels included in the input image, i is an integer from 1 to s, $l_i$ is an one-hot-encoding vector representing to which cluster an i-th pixel belongs on its corresponding first GT, and P(i) is a vector corresponding to a value included softmax score map corresponding to the i-th pixel.

As one example, at the step of (d), the lane parameters are polynomials representing relationships between each first component and each second component included in each coordinate of central pixels located in each center of a specific lane included the input image.

As one example, at the step of (e), the line fitting loss values are generated by referring to each of differences between (i) each value of the second component acquired by inputting the first component to the polynomials and (ii) each value of the second GT corresponding to the first component.

In accordance with another aspect of the present invention, there is provided a testing method of detecting one or more lanes included in an input image by using a lane mask, including steps of: (a) on condition that, after a first CNN generated a final feature map for training by applying one or more first convolution operations to a training image and generated a segmentation score map for training and an embedded feature map for training by using the final feature map for training, (1) a learning device has instructed a second CNN to acquire the final feature map for training, the segmentation score map for training, and the embedded feature map for training; (2) the learning device has instructed a lane masking layer of the second CNN to (i) recognize one or more lane candidates for training, corresponding to the lanes for training included in the training image, on the final feature map for training by referring to the segmentation score map for training and the embedded feature map for training, (ii) generate the lane mask for training which assigns one or more weights for training to one or more regions for training, which correspond to the lane candidates for training, on the final feature map for training and (iii) generate a masked feature map for training by referring to the final feature map for training and the lane mask for training; (3) the learning device has instructed a convolutional layer of the second CNN to generate a lane feature map for training by applying one or more second convolution operations to the masked feature map for training; (4) the learning device has instructed a first FC layer of the second CNN to generate a softmax score map for training by referring to the lane feature map for training, and instructing a second FC layer of the second CNN to generate one or more lane parameters for training by referring to the lane feature map for training; (5) the learning device (i) has instructed a multinomial logistic loss layer of the second CNN to generate softmax loss values by referring to the softmax score map for training and its corresponding first GT, (ii) has instructed a line fitting loss layer of the second CNN to generate line fitting loss values by referring to the lane parameters for training and their corresponding second GTs, and (iii) has backpropagated the softmax loss values and the line fitting loss values, to thereby learn parameters of at least part of the first FC layer, the second FC layer and the convolutional layer included in the second CNN, a testing device, after the first CNN has generated a final feature map for testing by applying one or more first convolution operations to the test image and has generated a segmentation score map for testing and an embedded feature map for testing by using the final feature map for testing, instructing the second CNN to acquire the final feature map for testing, the segmentation score map for testing, and the embedded feature map for testing; (b) the testing device instructing a lane masking layer of the second CNN to (i) recognize one or more lane candidates for testing, corresponding to the lanes for testing included in the test image, on the final feature map for testing by referring to the segmentation score map for testing and the embedded feature map for testing, (ii) generate the lane mask for testing which assigns one or more weights for testing to one or more regions for testing, which correspond to the lane candidates for testing, on the final feature map for testing and (iii) generate a masked feature map for testing by referring to the final feature map for testing and the lane mask for testing; (c) the testing device instructing a convolutional layer of the second CNN to generate a lane feature map for testing by applying one or more second convolution operations to the masked feature map for testing; (d) the testing device instructing a first FC layer of the second CNN to generate a softmax score map for testing by referring to the lane feature map for testing, and instructing a second FC layer of the second CNN to generate one or more lane parameters for testing by referring to the lane feature map for testing.

As one example, at the step of (b), the masked feature map for testing is generated by element-wise multiplying each of values included in the final feature map for testing corresponding to each of the pixels included in the test image and its corresponding value included in the lane mask for testing, so that values of the masked feature map for testing corresponding to the lane candidates for testing are assigned with one or more certain weights for testing.

As one example, at the step of (d), the lane parameters for testing are polynomials representing relationships between each first component and each second component included in each coordinate of central pixels located in each center of a specific lane included the test image.

In accordance with still another aspect of the present invention, there is provided a learning device of detecting one or more lanes included in an input image by using a lane mask, including: at least one memory that stores instructions; and at least one processor, on condition that (i) a first CNN has generated a final feature map by applying one or more first convolution operations to the input image and (ii) has generated a segmentation score map and an embedded feature map by using the final feature map, for instructing a second CNN to acquire the final feature map, the segmentation score map, and the embedded feature map; configured to execute the instructions to: perform processes of (I) instructing a lane masking layer of the second CNN to (i) recognize one or more lane candidates, corresponding to the lanes included in the input image, on the final feature map by referring to the segmentation score map and the embedded feature map, (ii) generate the lane mask which assigns one or more weights to one or more regions, which correspond to the lane candidates, on the final feature map and (iii) generate a masked feature map by referring to the final feature map and the lane mask, (II) instructing a convolutional layer of the second CNN to generate a lane feature map by applying one or more second convolution operations to the masked feature map, (III) instructing a first FC layer of the second CNN to generate a softmax score map by referring to the lane feature map, and instructing a second FC layer of the second CNN to generate one or more lane parameters by referring to the lane feature map, and (IV) (i) instructing a multinomial logistic loss layer of the second CNN to generate softmax loss values by referring to the softmax score map and its corresponding first GT, (ii) instructing a line fitting loss layer of the second CNN to generate line fitting loss values by referring to the lane parameters and their corresponding second GTs, and (iii) backpropagating the softmax loss values and the line fitting loss values, to thereby learn parameters of at least part of the first FC layer, the second FC layer and the convolutional layer included in the second CNN.

As one example, at the process of (II), the processor performs a process of instructing the convolutional layer of the second CNN to generate the lane feature map by applying the second convolution operations to the masked feature map, and then by further applying at least one global pooling operation to the masked feature map.

As one example, at the process of (I), the masked feature map is generated by element-wise multiplying each of values included in the final feature map corresponding to each of the pixels included in the input image and its corresponding value included in the lane mask, so that values of the masked feature map corresponding to the lane candidates are assigned with one or more certain weights.

As one example, the first CNN has generated the embedded feature map by transforming values of the final feature map in a way of (i) increasing each of inter-class differences among each of means of the values, included in the final feature map, corresponding to pixels of the respective lanes included in the input image or (ii) decreasing each of intra-class variances of the values, included in the final feature map, corresponding to pixels included in the respective lanes included in the input image.

As one example, at the process of (I), the processor performs a process of instructing the lane masking layer of the second CNN to recognize the lane candidates by (i) detecting the lane candidates by referring to the segmentation score map and (ii) classifying the lane candidates by referring to the embedded feature map.

As one example, at the process of (I), the processor performs a process of instructing the masking layer of the second CNN to generate the lane mask which assigns the weights to the regions, wherein the regions include pixels whose distances from boundaries of the lane candidates are smaller than a third threshold value.

As one example, at the process of (IV), the softmax loss values are generated by operations following a formula below, $$\text{sum of } \textit{softmax} \text{ loss} = -\frac{1}{s}\sum_{i}^{s} \log(P(i)^{l_i})$$

wherein, s is the number of the pixels included in the input image, i is an integer from 1 to s, $l_i$ is an one-hot-encoding vector representing to which cluster an i-th pixel belongs on its corresponding first GT, and P(i) is a vector corresponding to a value included softmax score map corresponding to the i-th pixel.

As one example, at the process of (III), the lane parameters are polynomials representing relationships between each first component and each second component included in each coordinate of central pixels located in each center of a specific lane included the input image.

As one example, at the process of (IV), the line fitting loss values are generated by referring to each of differences between (i) each value of the second component acquired by inputting the first component to the polynomials and (ii) each value of the second GT corresponding to the first component.

In accordance with still yet another aspect of the present invention, there is provided a testing device of detecting one or more lanes included in an input image by using a lane mask, including: at least one memory that stores instructions; and at least one processor, after a first CNN has generated a final feature map for testing by applying one or more first convolution operations to the test image and has generated a segmentation score map for testing and an embedded feature map for testing by using the final feature map for testing, for instructing a second CNN to acquire the final feature map for testing, the segmentation score map for testing, and the embedded feature map for testing, on condition that, after the first CNN generated a final feature map for training by applying the one or more first convolution operations to a training image and generated a segmentation score map for training and an embedded feature map for training by using the final feature map for training, (1) a learning device has instructed the second CNN to acquire the final feature map for training, the segmentation score map for training, and the embedded feature map for training; (2) the learning device has instructed a lane masking layer of the second CNN to (i) recognize one or more lane candidates for training, corresponding to the lanes for training included in the training image, on the final feature map for training by referring to the segmentation score map for training and the embedded feature map for training, (ii) generate the lane mask for training which assigns one or more weights for training to one or more regions for training, which correspond to the lane candidates for training, on the final feature map for training and (iii) generate a masked feature map for training by referring to the final feature map for training and the lane mask for training; (3) the learning device has instructed a convolutional layer of the second CNN to generate a lane feature map for training by applying one or more second convolution operations to the masked feature map for training; (4) the learning device has instructed a first FC layer of the second CNN to generate a softmax score map for training by referring to the lane feature map for training, and instructing a second FC layer of the second CNN to generate one or more lane parameters for training by referring to the lane feature map for training; (5) the learning device (i) has instructed a multinomial logistic loss layer of the second CNN to generate softmax loss values by referring to the softmax score map for training and its corresponding first GT, (ii) has instructed a line fitting loss layer of the second CNN to generate line fitting loss values by referring to the lane parameters for training and their corresponding second GTs, and (iii) has backpropagated the softmax loss values and the line fitting loss values, to thereby learn parameters of at least part of the first FC layer, the second FC layer and the convolutional layer included in the second CNN; configured to execute the instructions to: perform processes of (I) instructing the lane masking layer of the second CNN to (i) recognize one or more lane candidates for testing, corresponding to the lanes for testing included in the test image, on the final feature map for testing by referring to the segmentation score map for testing and the embedded feature map for testing, (ii) generate the lane mask for testing which assigns one or more weights for testing to one or more regions for testing, which correspond to the lane candidates for testing, on the final feature map for testing and (iii) generate a masked feature map for testing by referring to the final feature map for testing and the lane mask for testing; (II) instructing the convolutional layer of the second CNN to generate a lane feature map for testing by applying one or more second convolution operations to the masked feature map for testing; (III) instructing the first FC layer of the second CNN to generate a softmax score map for testing by referring to the lane feature map for testing, and instructing the second FC layer of the second CNN to generate one or more lane parameters for testing by referring to the lane feature map for testing.

As one example, at the process of (I), the masked feature map for testing is generated by element-wise multiplying each of values included in the final feature map for testing corresponding to each of the pixels included in the test image and its corresponding value included in the lane mask for testing, so that values of the masked feature map for testing corresponding to the lane candidates for testing are assigned with one or more certain weights for testing.

As one example, at the process of (III), the lane parameters for testing are polynomials representing relationships between each first component and each second component included in each coordinate of central pixels located in each center of a specific lane included the test image.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
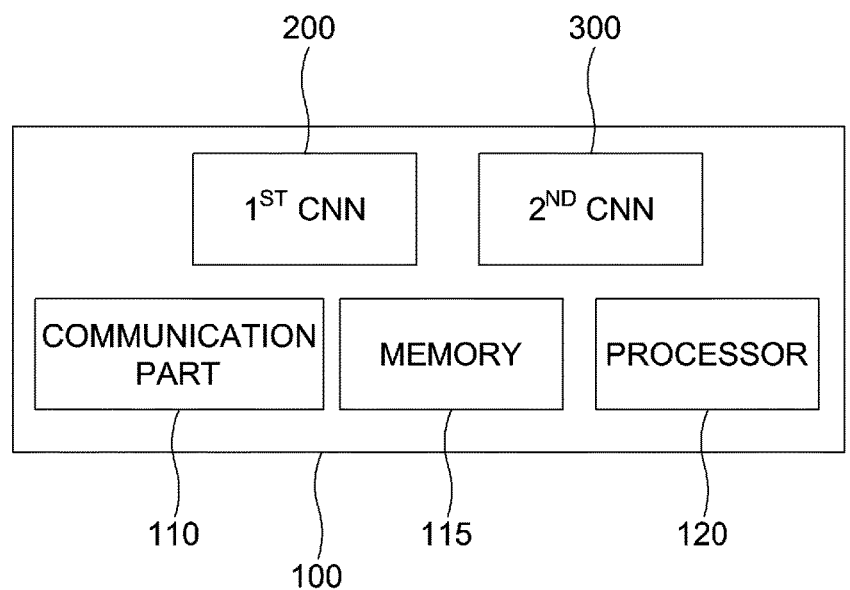
FIG. 1 shows a configuration of a learning device for performing processes of detecting lanes included in input images and fitting the lane regions by using a lane mask.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 shows a configuration of a learning device for performing processes of detecting lanes included in input images and fitting the lane regions by using a lane mask.

By referring to FIG. 1, the learning device 100 may include a first CNN 200 and a second CNN 300. Functions of inputting and outputting various data and those of operating the various data by the first CNN 200 and the second CNN 300 may be performed by a communication part 110 and a processor 120 therein respectively. But, in FIG. 1, detailed explanation on how the communication part 110 and the processor 120 are connected is omitted. In addition, the learning device may further include a memory 115 capable of storing computer readable instructions for performing following processes. As one example, the processor, the memory, a medium, etc. may be integrated with an integrated processor.

Figure 2:
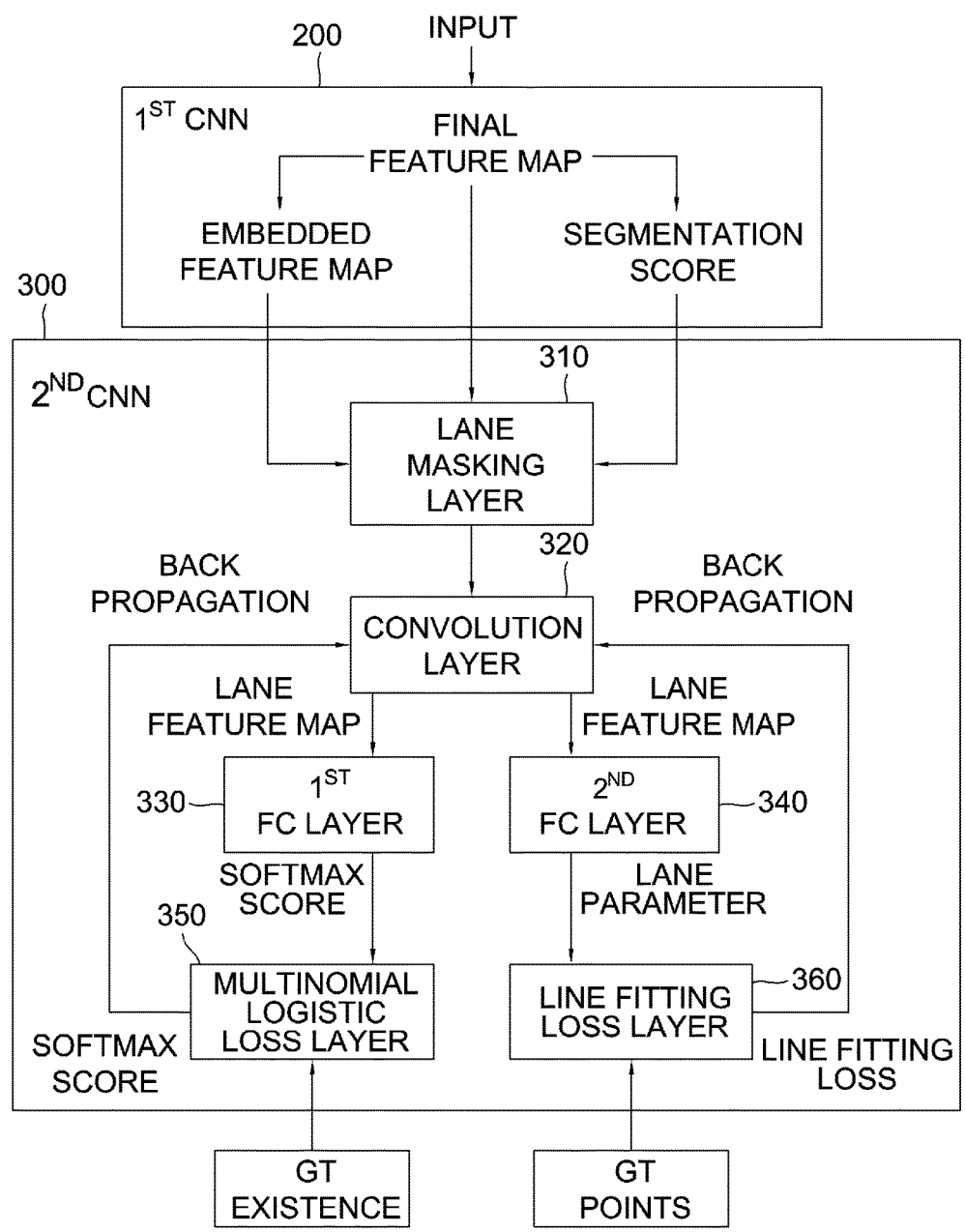
FIG. 2 shows a configuration of a second CNN and a relationship between a first CNN and the second CNN.

FIG. 2 shows a configuration of the second CNN and a relationship between the first CNN and the second CNN.

By referring to FIG. 2, the first CNN 200 may generate a final feature map, a segmentation score map and an embedded feature map, and may deliver those to the second CNN 300. The second CNN 300 may include a lane masking layer 310, a convolutional layer 320, a first FC layer 330, a second FC layer 340, a multinomial logistic loss layer 350 and a line fitting loss layer 360.

Specifically, the first CNN 200 may include (i) an encoding layer for performing one or more first convolution operations, (ii) a decoding layer for performing one or more first deconvolution operations, (iii) a softmax layer for performing softmax operations, and (iv) an embedding layer for performing embedding operations. When an input image is acquired by the communication part 110, the first CNN 200 may instruct (i) the encoding layer and the decoding layer to generate the final feature map by applying the first convolution operations to the input image, and then by applying the first deconvolution operations to the input image, (ii) the softmax layer to generate the segmentation score map by applying the softmax operations to the final feature map, and (iii) the embedding layer to generate the embedded feature map by applying the embedding operations to the final feature map. After that, the final feature map, the segmentation score map and the embedded feature map may be inputted to the second CNN 300.

Then, the second CNN 300 may instruct the lane masking layer 310 (i) to recognize one or more lane candidates, corresponding to one or more lanes included in the input image, by referring to the segmentation score map and the embedded feature map, and (ii) to generate the lane mask which assigns one or more weights to one or more regions, which correspond to the lane candidates, on the final feature map, and (iii) to generate a masked feature map by referring to the final feature map and the lane mask.

And the second CNN 300 may instruct the convolutional layer 320 to generate a lane feature map by applying one or more second convolution operations to the masked feature map. Hereafter, the second CNN 300 may instruct the first FC layer 330 and the second FC layer 340 to generate respectively a softmax score map and one or more lane parameters by using the lane feature map. After the softmax score map is acquired by the multinomial logistic layer 350 and the lane parameters are acquired by the line fitting loss layer 360, the second CNN 300 may instruct the multinomial logistic layer 350 and the line fitting loss layer 360 to generate respectively softmax loss values and line fitting loss values by referring to its corresponding first GT and their corresponding second GTs respectively. The softmax loss values and the line fitting loss values may be backpropagated to learn parameters of at least part of the first FC layer, the second FC layer and the convolutional layer included in the second CNN 300.

Hereinafter, a process of detecting the non-lane road region and fitting the lane will be explained below, by referring to FIG. 3A, FIG. 3B, FIG. 4, and FIG. 5.

The first CNN 200 may generate the final feature map by applying the first convolution operations to the input image, and then by applying the first deconvolution operations to the input image which is acquired by the communication part 110, and generate the embedded feature map and the segmentation score map by referring to the final feature map.

Herein, the embedded feature map is generated by transforming values of the final feature map in a way of (i) increasing each of inter-class differences among each of means of the values, included in the final feature map, corresponding to pixels of the respective lanes included in the input image or (ii) decreasing each of intra-class variances of the values, included in the final feature map, corresponding to pixels included in the respective lanes included in the input image.

And herein, the segmentation score map is generated by applying the softmax operations to the final feature map. The softmax operations normalize values of the final feature map so that the values are mapped into probabilities, from 0 to 1. Herein, each of those represents each of clusters to which each corresponding pixel belongs. Accordingly, the segmentation score map includes sets of feature values representing each pixel in the input image belongs to which lane region among the lane regions included in the input image or a background region, i.e., a hill region or a sky region.

After the final feature map, the segmentation score map and the embedded feature map are generated by the first CNN 200 as above, the second CNN 300 may acquire those feature maps, and instruct the lane masking layer 310 to perform processes for generating the lane mask.

Herein, the second CNN 300 may instruct the lane masking layer 310 to recognize the lane candidates by referring to the segmentation score map and the embedded feature map. By referring to the segmentation score map, the lane masking layer 310 may detect the lane candidates, separate from the non-lane road regions and the background regions included in the input image, and by referring to the embedded feature map, the lane masking layer 310 may classify the lane candidates lane by lane. As said above, each of inter-class differences among each of means of the values, included in the embedded feature map, corresponding to pixels of the respective lanes included in the input image is increased or each of intra-class variances of the values, included in the embedded feature map, corresponding to pixels included in the respective lanes included in the input image is decreased.

In this process, regions which are not likely to be the lanes are also recognized generously as the lane candidates, because some lane candidates whose probabilities of being one of the lanes are lower than a preset threshold value will be filtered in subsequent processes.

After the lane candidates are recognized, the lane mask, which assigns one or more weights to one or more regions, corresponding to the lane candidates, on the input image. The lane mask is a sort of a weight matrix, so that the weights are assigned to the regions by pixel-wise multiplication of the lane mask and the final feature map.

The regions above, corresponding to the lane candidates, may include pixels whose distances from side points of the lane candidates are smaller than a third threshold value. Herein, the side points of the lane candidates may be intersection points between a horizontal line and boundaries of the lane candidates. As the regions include pixels around the lane candidates, the weights can be assigned to surroundings of the lane candidates to thereby recognize the lanes more accurately.

By generating the lane mask as described above, the second CNN 300 may instruct the lane masking layer 310 to generate the masked feature map by referring to the final feature map and the lane mask. One example of the masked feature map is explained with FIG. 3B, so that the final feature map shown in FIG. 3A may be compared with the masked feature map shown in FIG. 3B.

Figure 3A:
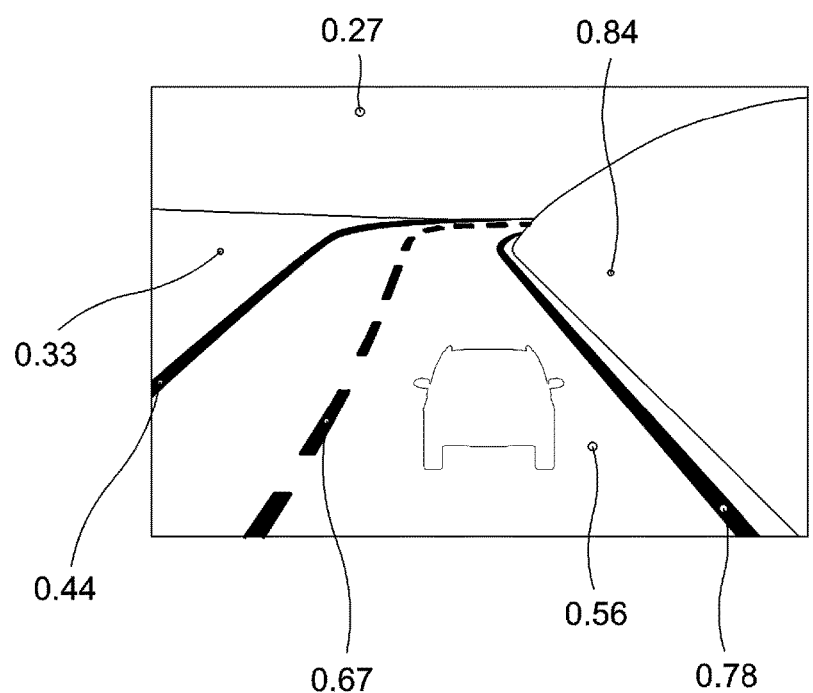
FIG. 3A shows an example of a final feature map generated by the first CNN.

FIG. 3A shows an example of the final feature map generated by the first CNN 200.

By referring to FIG. 3A, it may be seen that values of the final feature map, each corresponding to regions included in the input image, e.g., a sky region, a hill region, lane regions, a non-lane road region, do not vary much.

Figure 3B:
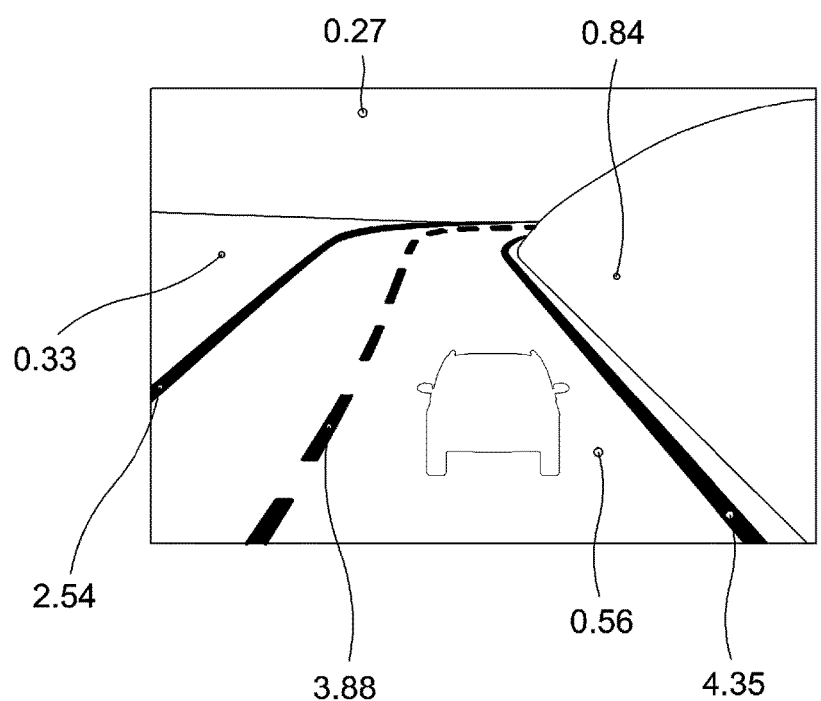
FIG. 3B shows an example of a masked feature map generated by referring to a lane mask and the final feature map.

FIG. 3B shows an example of the masked feature map generated by the lane masking layer 310 of the second CNN 300.

By referring to FIG. 3B, it may be seen that the values of the final feature map corresponding to the lane regions became larger than those of FIG. 3A. And it's because of the multiplication of the lane mask and the final feature map, as explained above. Due to the lane mask, which is a sort of the weight matrix, the values of the final feature map corresponding to the lane candidates may be weighted by the multiplication above.

After, the second CNN 300 may instruct the convolutional layer 320 to generate the lane feature map (i) by applying the one or more second convolution operations to the masked feature map or (ii) by further applying at least one global pooling operation to the masked feature map after applying the second convolution operations. The lane feature map may be delivered to the first FC layer 330 and the second FC layer 340 (i) to recognize the non-lane road region and (ii) to generate the lane parameters. Processes performed by the first FC layer 330 and the second FC layer 340 may be explained respectively below.

The process of generating the softmax loss values for learning a recognition of the non-lane road region will be explained first.

After the lane feature map is delivered to the first FC layer 330, the first FC layer 330 generates output values by applying classification operations to the lane feature map, and generates the softmax score map by applying the softmax operations to the output values.

The softmax operations above are the same softmax operations performed by the first CNN 200. Therefore, a specific explanation on the softmax operations are omitted.

In the learning process, the softmax score map is delivered to the multinomial logistic loss layer 350. After, the delivered softmax score map and its corresponding first GT are referred to generate the softmax loss values.

$$\text{sum of } \textit{softmax } \text{loss} = -\frac{1}{s}\sum_{i}^{s}\log(P(i)^{l_i})$$

The second CNN 300 may instruct the multinomial logistic loss layer 350 to generate the softmax loss values by applying operations, following the formula above, to the softmax score map. Herein, s is the number of the pixels included in the input image, i is an integer from 1 to s, $l_i$ is an one-hot-encoding vector representing to which cluster an i-th pixel belongs on its corresponding first GT, and P(i) is a vector corresponding to a value included softmax score map corresponding to the i-th pixel.

Figure 4:
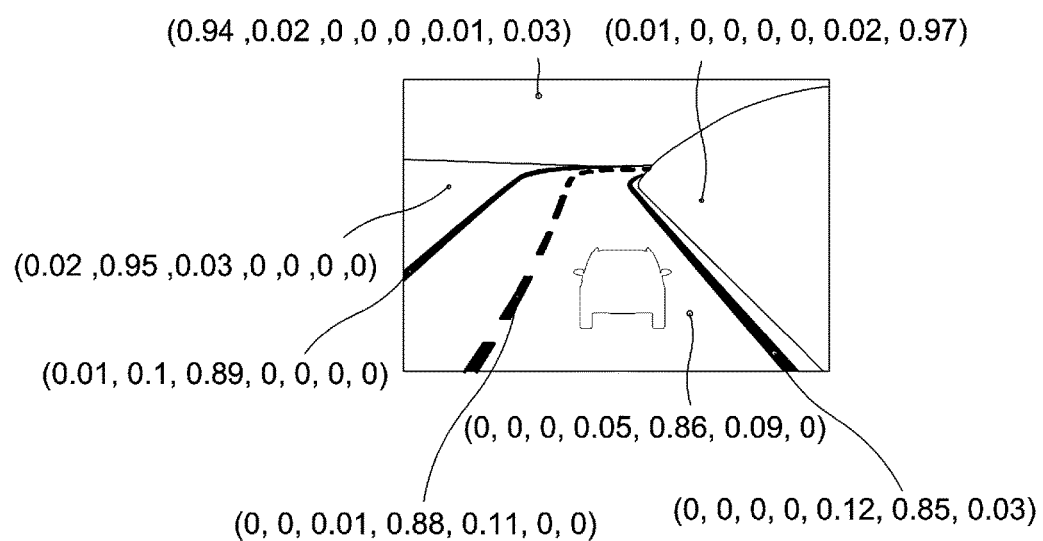
FIG. 4 shows an example of a segmentation score map generated by a first FC layer.

FIG. 4 shows an example of the segmentation score map generated by the first FC layer.

By referring to FIG. 4, the formula on the softmax loss values above will be explained more specifically. In FIG. 4, it may be seen that values of the softmax score corresponding to a specific pixel on the left lane is (0.01, 0.1, 0.89, 0, 0, 0, 0). Here, its corresponding $l^i$ vector is (0, 0, 1, 0, 0, 0, 0). Then, a softmax loss value corresponding to the specific pixel is calculated as $-1 \times \log(0.89)$. After the softmax loss values are calculated as described above pixel by pixel, the softmax loss values may be summed and then divided by the number of the pixels included in the input image. The softmax loss values may be calculated by the formula above, but it may not be limited to this.

Next, the process of generating the line fitting loss values for learning how to fit the lane regions will be explained.

After the lane feature map is delivered to the second FC layer 340, the second FC layer 340 generates the lane parameters which are polynomials representing relationships between each first component and each second component, i.e, the first component as X coordinate and the second component as Y coordinate, included in each coordinate of central pixels located in each center of each lane candidate.

Figure 5:
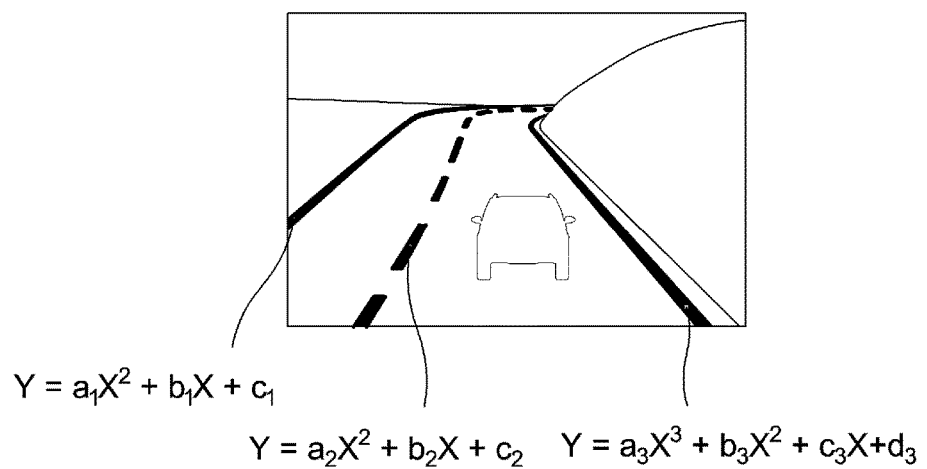
FIG. 5 shows an example of lane parameters generated by a second FC layer.

FIG. 5 shows an example of the lane parameters generated by the second FC layer.

In the learning process, the lane parameters are delivered to the line fitting loss layer 360. After, the delivered lane parameters and their corresponding second GTs are referred to generate the line fitting loss values.

The line fitting loss values are generated by referring to each of differences between (i) each value of the second component acquired by inputting the first component to the polynomials and (ii) each value of the second GT corresponding to the first component.

For example, if a specific polynomial corresponding to a specific lane parameter is Y=3X, and its corresponding center coordinate is (1,3.5) on the second GT, then an error corresponding to the specific lane parameter is calculated as $3.5-(1\times3)=0.5$. By referring to errors calculated as described above, each of the line fitting loss values, for each of the pixels, may be generated.

After the softmax loss values and the line fitting loss values are generated as described above, the softmax loss values and the line fitting loss values are backpropagated to learn parameters of at least part of the first FC layer, the second FC layer and the convolutional layer included in the second CNN 300.

So far the learning process of the learning device 100 in accordance with the present invention was explained. Hereafter, (i) a configuration of a testing device of the present invention, and (ii) differences between the learning device 100 and the testing device will be explained.

For reference, in the description below, the phrase "for training" is added for terms related to the learning processes, and the phrase "for testing" is added for terms related to testing processes, to avoid possible confusion.

First, on condition that, after the first CNN 200 generated the final feature map for training by applying the one or more first convolution operations to the training image and generated the segmentation score map for training and the embedded feature map for training by using the final feature map for training, the learning device 100 has instructed the second CNN 300 to acquire the final feature map for training, the segmentation score map for training, and the embedded feature map for training; (2) the learning device 100 has instructed the lane masking layer 310 of the second CNN 300 to (i) recognize the one or more lane candidates for training, corresponding to the lanes for training included in the training image, on the final feature map for training by referring to the segmentation score map for training and the embedded feature map for training, (ii) generate the lane mask for training which assigns the one or more weights for training to the one or more regions for training, which correspond to the lane candidates for training, on the final feature map for training and (iii) generate the masked feature map for training by referring to the final feature map for training and the lane mask for training; (3) the learning device 100 has instructed the convolutional layer 320 of the second CNN 300 to generate the lane feature map for training by applying the one or more second convolution operations to the masked feature map for training; (4) the learning device 100 has instructed the first FC layer 330 of the second CNN 300 to generate the softmax score map for training by referring to the lane feature map for training, and instructing the second FC layer 340 of the second CNN 300 to generate the one or more lane parameters for training by referring to the lane feature map for training; (5) the learning device 100 (i) has instructed the multinomial logistic loss layer 350 of the second CNN 300 to generate the softmax loss values by referring to the softmax score map for training and its corresponding first GT, (ii) has instructed the line fitting loss layer 360 of the second CNN 300 to generate the line fitting loss values by referring to the lane parameters for training and their corresponding second GTs, and (iii) has backpropagated the softmax loss values and the line fitting loss values, to thereby learn the parameters of at least part of the first FC layer 330, the second FC layer 340 and the convolutional layer 320 included in the second CNN 300, a testing device, after (i) the first CNN 200 has generated a final feature map for testing by applying one or more first convolution operations to the test image and (ii) has generated a segmentation score map for testing and an embedded feature map for testing by using the final feature map for testing, may instruct a second CNN 300 to acquire the final feature map for testing, the segmentation score map for testing, and the embedded feature map for testing.

Second, the testing device may instruct the lane masking layer 310 of the second CNN 300 to (i) recognize one or more lane candidates for testing, corresponding to the lanes for testing included in the test image, on the final feature map for testing by referring to the segmentation score map for testing and the embedded feature map for testing, (ii) generate the lane mask for testing which assigns one or more weights for testing to one or more regions for testing, which correspond to the lane candidates for testing, on the final feature map for testing and (iii) generate a masked feature map for testing by referring to the final feature map for testing and the lane mask for testing.

Third, the testing device may instruct the convolutional layer 320 of the second CNN 300 to generate a lane feature map for testing by applying one or more second convolution operations to the masked feature map for testing;

Finally, the testing device may instruct the first FC layer 330 of the second CNN 300 to generate a softmax score map for testing by referring to the lane feature map for testing, and instructing the second FC layer 340 of the second CNN 300 to generate one or more lane parameters for testing by referring to the lane feature map for testing.

Because the parameters of the first FC layer 330, the second FC layer 340 and the convolutional layer 320 has been learned at the time of testing, the processes of generating the loss values and backpropagating the loss values are omitted. Accordingly, the configuration of the testing device is the same to the configuration of the learning device 100 except the part for generating the loss values.

It is an advantage of the present invention to provide an integrated process including (i) a main process for recognizing lanes in input images, and (ii) post processing processes for filtering non-lane road regions and fitting the lane regions.

Through the processes, attention-based lane detection can be performed without post-processing, thereby detecting lanes at distance more accurately.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method of detecting one or more lanes included in an input image by using a lane mask, comprising steps of:
    (a) on condition that (i) a first CNN has generated a final feature map by applying one or more first convolution operations to the input image and (ii) has generated a segmentation score map and an embedded feature map by using the final feature map, a learning device instructing a second CNN to acquire the final feature map, the segmentation score map, and the embedded feature map;

(b) the learning device instructing a lane masking layer of the second CNN to (i) recognize one or more lane candidates, corresponding to the lanes included in the input image, on the final feature map by referring to the segmentation score map and the embedded feature map, (ii) generate the lane mask which assigns one or more weights to one or more regions, which correspond to the lane candidates, on the final feature map and (iii) generate a masked feature map by referring to the final feature map and the lane mask;

(c) the learning device instructing a convolutional layer of the second CNN to generate a lane feature map by applying one or more second convolution operations to the masked feature map;

(d) the learning device instructing a first FC layer of the second CNN to generate a softmax score map by referring to the lane feature map, and instructing a second FC layer of the second CNN to generate one or more lane parameters by referring to the lane feature map; and (e) the learning device (i) instructing a multinomial logistic loss layer of the second CNN to generate softmax loss values by referring to the softmax score map and its corresponding first GT, (ii) instructing a line fitting loss layer of the second CNN to generate line fitting loss values by referring to the lane parameters and their corresponding second GTs, and (iii) backpropagating the softmax loss values and the line fitting loss values, to thereby learn parameters of at least part of the first FC layer, the second FC layer and the convolutional layer included in the second CNN.

2. The method of claim 1, wherein, at the step of (c), the learning device instructs the convolutional layer of the second CNN to generate the lane feature map by applying the second convolution operations to the masked feature map, and then by further applying at least one global pooling operation to the masked feature map.

3. The method of claim 1, wherein, at the step of (b), the masked feature map is generated by element-wise multiplying each of values included in the final feature map corresponding to each of the pixels included in the input image and its corresponding value included in the lane mask, so that values of the masked feature map corresponding to the lane candidates are assigned with one or more certain weights.

4. The method of claim 1, wherein, at the step of (a), the first CNN has generated the embedded feature map by transforming values of the final feature map in a way of (i) increasing each of inter-class differences among each of means of the values, included in the final feature map, corresponding to pixels of the respective lanes included in the input image or (ii) decreasing each of intra-class variances of the values, included in the final feature map, corresponding to pixels included in the respective lanes included in the input image.

5. The method of claim 1, wherein, at the step of (b), the learning device instructs the lane masking layer of the second CNN to recognize the lane candidates by (i) detecting the lane candidates by referring to the segmentation score map and (ii) classifying the lane candidates by referring to the embedded feature map.

6. The method of claim 1, wherein, at the step of (b), the learning device instructs the masking layer of the second CNN to generate the lane mask which assigns the weights to the regions, wherein the regions include pixels whose distances from boundaries of the lane candidates are smaller than a third threshold value.

7. The method of claim 1, wherein, at the step of (e), the softmax loss values are generated by operations following a formula below, $$\text{sum of } \textit{softmax} \text{ loss} = -\frac{1}{s}\sum_{i}^{s}\log(P(i)^{l_i})$$

wherein, s is the number of the pixels included in the input image, i is an integer from 1 to s, $l_i$ is an one-hot-encoding vector representing to which cluster an i-th pixel belongs on its corresponding first GT, and P(i) is a vector corresponding to a value included softmax score map corresponding to the i-th pixel.

8. The method of claim 1, wherein, at the step of (d), the lane parameters are polynomials representing relationships between each first component and each second component included in each coordinate of central pixels located in each center of a specific lane included the input image.

9. The method of claim 8, wherein, at the step of (e), the line fitting loss values are generated by referring to each of differences between (i) each value of the second component acquired by inputting the first component to the polynomials and (ii) each value of the second GT corresponding to the first component.

10. A testing method of detecting one or more lanes included in an input image by using a lane mask, comprising steps of:

(a) on condition that, after a first CNN generated a final feature map for training by applying one or more first convolution operations to a training image and generated a segmentation score map for training and an embedded feature map for training by using the final feature map for training, (1) a learning device has instructed a second CNN to acquire the final feature map for training, the segmentation score map for training, and the embedded feature map for training; (2) the learning device has instructed a lane masking layer of the second CNN to (i) recognize one or more lane candidates for training, corresponding to the lanes for training included in the training image, on the final feature map for training by referring to the segmentation score map for training and the embedded feature map for training, (ii) generate the lane mask for training which assigns one or more weights for training to one or more regions for training, which correspond to the lane candidates for training, on the final feature map for training and (iii) generate a masked feature map for training by referring to the final feature map for training and the lane mask for training; (3) the learning device has instructed a convolutional layer of the second CNN to generate a lane feature map for training by applying one or more second convolution operations to the masked feature map for training; (4) the learning device has instructed a first FC layer of the second CNN to generate a softmax score map for training by referring to the lane feature map for training, and instructing a second FC layer of the second CNN to generate one or more lane parameters for training by referring to the lane feature map for training; (5) the learning device (i)

has instructed a multinomial logistic loss layer of the second CNN to generate softmax loss values by referring to the softmax score map for training and its corresponding first GT, (ii) has instructed a line fitting loss layer of the second CNN to generate line fitting loss values by referring to the lane parameters for training and their corresponding second GTs, and (iii) has backpropagated the softmax loss values and the line fitting loss values, to thereby learn parameters of at least part of the first FC layer, the second FC layer and the convolutional layer included in the second CNN, a testing device, after the first CNN has generated a final feature map for testing by applying one or more first convolution operations to the test image and has generated a segmentation score map for testing and an embedded feature map for testing by using the final feature map for testing, instructing the second CNN to acquire the final feature map for testing, the segmentation score map for testing, and the embedded feature map for testing;

(b) the testing device instructing the lane masking layer of the second CNN to (i) recognize one or more lane candidates for testing, corresponding to the lanes for testing included in the test image, on the final feature map for testing by referring to the segmentation score map for testing and the embedded feature map for testing, (ii) generate the lane mask for testing which assigns one or more weights for testing to one or more regions for testing, which correspond to the lane candidates for testing, on the final feature map for testing and (iii) generate a masked feature map for testing by referring to the final feature map for testing and the lane mask for testing;

(c) the testing device instructing the convolutional layer of the second CNN to generate a lane feature map for testing by applying one or more second convolution operations to the masked feature map for testing; and (d) the testing device instructing the first FC layer of the second CNN to generate a softmax score map for testing by referring to the lane feature map for testing, and instructing the second FC layer of the second CNN to generate one or more lane parameters for testing by referring to the lane feature map for testing.

11. The method of claim 10, wherein, at the step of (b), the masked feature map for testing is generated by element-wise multiplying each of values included in the final feature map for testing corresponding to each of the pixels included in the test image and its corresponding value included in the lane mask for testing, so that values of the masked feature map for testing corresponding to the lane candidates for testing are assigned with one or more certain weights for testing.

12. The method of claim 10, wherein, at the step of (d), the lane parameters for testing are polynomials representing relationships between each first component and each second component included in each coordinate of central pixels located in each center of a specific lane included the test image.

13. A learning device of detecting one or more lanes included in an input image by using a lane mask, comprising:
at least one memory that stores instructions; and
at least one processor, on condition that after a first CNN has generated a final feature map by applying one or more first convolution operations to the input image and (ii) has generated a segmentation score map and an embedded feature map by using the final feature map, for instructing a second CNN to acquire the final feature map, the segmentation score map, and the embedded feature map; configured to execute the instructions to: perform processes of (I) instructing a lane masking layer of the second CNN to (i) recognize one or more lane candidates, corresponding to the lanes included in the input image, on the final feature map by referring to the segmentation score map and the embedded feature map, (ii) generate the lane mask which assigns one or more weights to one or more regions, which correspond to the lane candidates, on the final feature map and (iii) generate a masked feature map by referring to the final feature map and the lane mask, (II) instructing a convolutional layer of the second CNN to generate a lane feature map by applying one or more second convolution operations to the masked feature map, (III) instructing a first FC layer of the second CNN to generate a softmax score map by referring to the lane feature map, and instructing a second FC layer of the second CNN to generate one or more lane parameters by referring to the lane feature map, and (IV) (i) instructing a multinomial logistic loss layer of the second CNN to generate softmax loss values by referring to the softmax score map and its corresponding first GT, (ii) instructing a line fitting loss layer of the second CNN to generate line fitting loss values by referring to the lane parameters and their corresponding second GTs, and (iii) backpropagating the softmax loss values and the line fitting loss values, to thereby learn parameters of at least part of the first FC layer, the second FC layer and the convolutional layer included in the second CNN.

14. The learning device of claim 13, wherein, at the process of (II), the processor performs a process of instructing the convolutional layer of the second CNN to generate the lane feature map by applying the second convolution operations to the masked feature map, and then by further applying at least one global pooling operation to the masked feature map.

15. The learning device of claim 13, wherein, at the process of (I), the masked feature map is generated by element-wise multiplying each of values included in the final feature map corresponding to each of the pixels included in the input image and its corresponding value included in the lane mask, so that values of the masked feature map corresponding to the lane candidates are assigned with one or more certain weights.

16. The learning device of claim 13, wherein, the first CNN has generated the embedded feature map by transforming values of the final feature map in a way of (i) increasing each of inter-class differences among each of means of the values, included in the final feature map, corresponding to pixels of the respective lanes included in the input image or (ii) decreasing each of intra-class variances of the values, included in the final feature map, corresponding to pixels included in the respective lanes included in the input image.

17. The learning device of claim 13, wherein, at the process of (I), the processor performs a process of instructing the lane masking layer of the second CNN to recognize the lane candidates by (i) detecting the lane candidates by referring to the segmentation score map and (ii) classifying the lane candidates by referring to the embedded feature map.

18. The learning device of claim 13, wherein, at the process of (I), the processor performs a process of instructing the masking layer of the second CNN to generate the lane mask which assigns the weights to the regions, wherein the regions include pixels whose distances from boundaries of the lane candidates are smaller than a third threshold value.

19. The learning device of claim 13, wherein, at the process of (IV), the softmax loss values are generated by operations following a formula below, $$\text{sum of } softmax \text{ loss} = -\frac{1}{s}\sum_{i}^{s} \log(P(i)^{l_i})$$

wherein, s is the number of the pixels included in the input image, i is an integer from 1 to s, $l_i$ is an one-hot-encoding vector representing to which cluster an i-th pixel belongs on its corresponding first GT, and P(i) is a vector corresponding to a value included softmax score map corresponding to the i-th pixel.

20. The learning device of claim 13, wherein, at the process of (III), the lane parameters are polynomials representing relationships between each first component and each second component included in each coordinate of central pixels located in each center of a specific lane included the input image.

21. The learning device of claim 20, wherein, at the process of (IV), the line fitting loss values are generated by referring to each of differences between (i) each value of the second component acquired by inputting the first component to the polynomials and (ii) each value of the second GT corresponding to the first component.

22. A testing device of detecting one or more lanes included in an input image by using a lane mask, comprising:
at least one memory that stores instructions; and
at least one processor, after a first CNN has generated a final feature map for testing by applying one or more first convolution operations to the test image and has generated a segmentation score map for testing and an embedded feature map for testing by using the final feature map for testing, for instructing a second CNN to acquire the final feature map for testing, the segmentation score map for testing, and the embedded feature map for testing, on condition that, after the first CNN generated a final feature map for training by applying the one or more first convolution operations to a training image and generated a segmentation score map for training and an embedded feature map for training by using the final feature map for training, (1) a learning device has instructed the second CNN to acquire the final feature map for training, the segmentation score map for training, and the embedded feature map for training, (2) the learning device has instructed a lane masking layer of the second CNN to (i) recognize one or more lane candidates for training, corresponding to the lanes for training included in the training image, on the final feature map for training by referring to the segmentation score map for training and the embedded feature map for training, (ii) generate the lane mask for training which assigns one or more weights for training to one or more regions for training, which correspond to the lane candidates for training, on the final feature map for training and (iii) generate a masked feature map for training by referring to the final feature map for training and the lane mask for training, (3) the learning device has instructed a convolutional layer of the second CNN to generate a lane feature map for training by applying one or more second convolution operations to the masked feature map for training, (4) the learning device has instructed a first FC layer of the second CNN to generate a softmax score map for training by referring to the lane feature map for training, and instructing a second FC layer of the second CNN to generate one or more lane parameters for training by referring to the lane feature map for training, and; (5) the learning device (i) has instructed a multinomial logistic loss layer of the second CNN to generate softmax loss values by referring to the softmax score map for training and its corresponding first GT, (ii) has instructed a line fitting loss layer of the second CNN to generate line fitting loss values by referring to the lane parameters for training and their corresponding second GTs, and (iii) has backpropagated the softmax loss values and the line fitting loss values, to thereby learn parameters of at least part of the first FC layer, the second FC layer and the convolutional layer included in the second CNN; configured to execute the instructions to: perform processes of, after a first CNN has generated a final feature map for testing by applying one or more first convolution operations to the test image and has generated a segmentation score map for testing and an embedded feature map for testing by using the final feature map for testing, for instructing a second CNN to acquire the final feature map for testing, the segmentation score map for testing, and the embedded feature map for testing, (I) instructing the lane masking layer of the second CNN to (i) recognize one or more lane candidates for testing, corresponding to the lanes for testing included in the test image, on the final feature map for testing by referring to the segmentation score map for testing and the embedded feature map for testing, (ii) generate the lane mask for testing which assigns one or more weights for testing to one or more regions for testing, which correspond to the lane candidates for testing, on the final feature map for testing and (iii) generate a masked feature map for testing by referring to the final feature map for testing and the lane mask for testing; (II) instructing the convolutional layer of the second CNN to generate a lane feature map for testing by applying one or more second convolution operations to the masked feature map for testing; and (III) instructing the first FC layer of the second CNN to generate a softmax score map for testing by referring to the lane feature map for testing, and instructing the second FC layer of the second CNN to generate one or more lane parameters for testing by referring to the lane feature map for testing.

23. The testing device of claim 22, wherein, at the process of (I), the masked feature map for testing is generated by element-wise multiplying each of values included in the final feature map for testing corresponding to each of the pixels included in the test image and its corresponding value included in the lane mask for testing, so that values of the masked feature map for testing corresponding to the lane candidates for testing are assigned with one or more certain weights for testing.

24. The testing device of claim 22, wherein, at the process of (III), the lane parameters for testing are polynomials representing relationships between each first component and each second component included in each coordinate of central pixels located in each center of a specific lane included the test image.

* * * * *